United States Patent [19]

Dixon

[11] Patent Number: 5,104,018
[45] Date of Patent: Apr. 14, 1992

[54] ARTICLE CARRYING SYSTEM

[75] Inventor: Michael Dixon, Ardross, Australia

[73] Assignee: Rola Roof Racks International, Inc., Torrance, Calif.

[21] Appl. No.: 711,594

[22] Filed: Jun. 6, 1991

Related U.S. Application Data

[63] Continuation of Ser. No. 539,291, Jun. 15, 1990, abandoned, and a continuation of Ser. No. 416,782, Oct. 4, 1989, abandoned.

[51] Int. Cl.⁵ .............................................. B60R 9/04
[52] U.S. Cl. .................................. 224/321; 224/326; 410/150
[58] Field of Search ............... 224/321, 326, 325, 309, 224/315; 410/104, 105, 75, 150; 248/297.2, 503

[56] References Cited

U.S. PATENT DOCUMENTS 3,554,416  1/1971  Bott ..................................... 224/321
4,406,386  9/1983  Rasor et al. ......................... 224/321
4,448,337  5/1984  Cronce .............................. 224/326

Primary Examiner—Linda J. Sholl
Attorney, Agent, or Firm—Pretty, Schroeder, Brueggemann & Clark

[57] ABSTRACT

An improved article carrying system for a vehicle having a pair of generally flat rails directly mounted to the vehicle surface, each rail being characterized by an upstanding wall with a sidewardly facing track formed therein and a ridge spaced from and parallel to the wall. A slider for mounting article support and securing members has a pedestal which rests on the flat surface of the rail and is captured in the track between the wall and the ridge. A grip bar having a plurality of spaced-apart locking tabs is swingably mounted to the slider whereby when the grip bar overlies the rail, the locking tabs on the grip bar lockingly engage the protrusions on the rail, and when the grip bar is swung cross-wise to the rail, the locking tabs clear the protrusions to allow the slider to be moved along the rail.

22 Claims, 3 Drawing Sheets

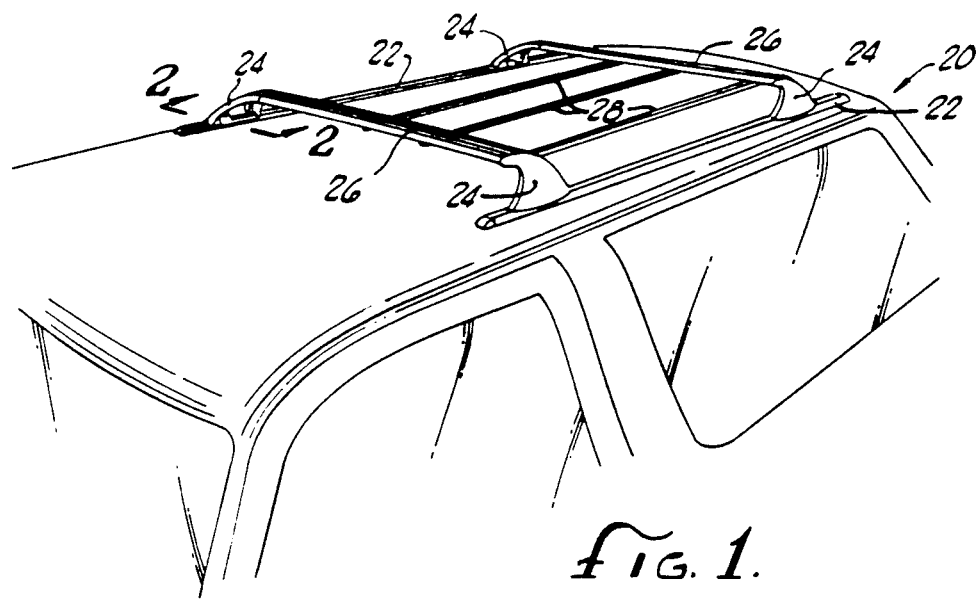
fig. 1.
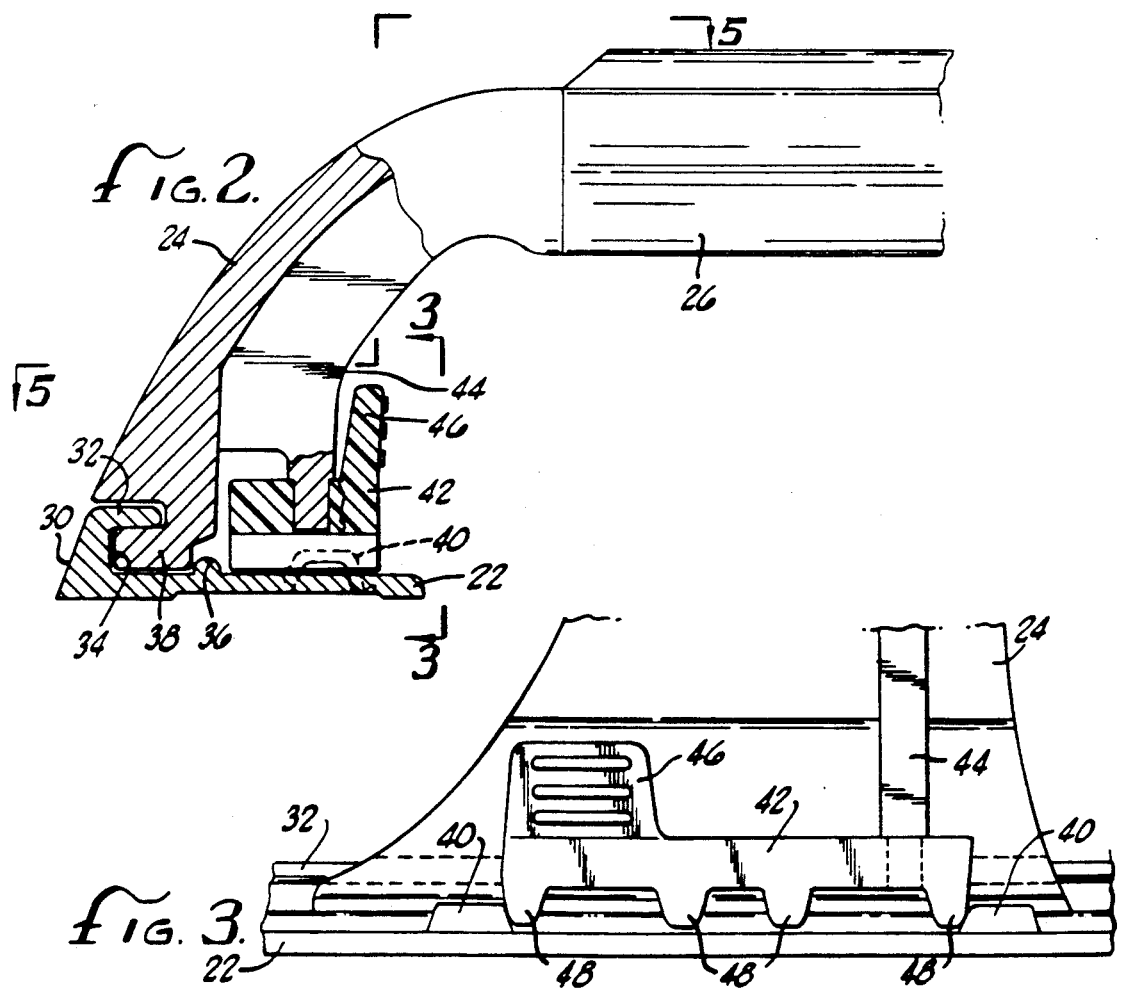
fig. 2.
fig. 3.

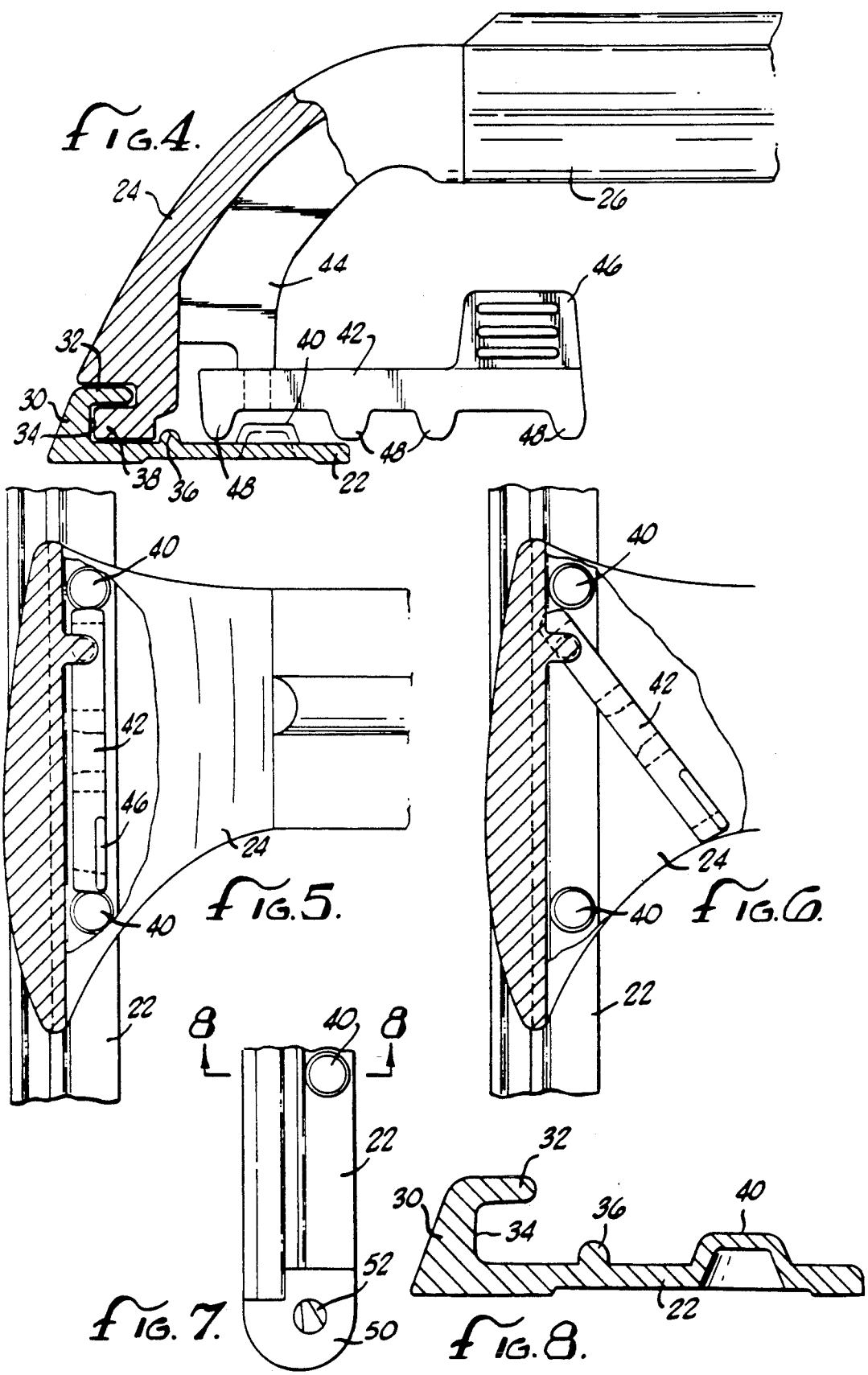

ARTICLE CARRYING SYSTEM

This is a continuation of application Ser. No. 539,291, filed June 15, 1990, and a continuation of Ser. No. 416,782, filed Oct. 4, 1989, both now abandoned.

BACKGROUND OF THE INVENTION

The present invention relates generally to article carrying systems for motor vehicles, and more particularly to the type of system on which various article support or securing members may be adjustably mounted and/or removed.

Article carrying systems in the form of roof or trunk-mounted racks are commonly used on automobiles, vans and other vehicles. Such systems frequently use longitudinally disposed slats directly secured to the vehicle surface to provide a low profile. Such slats have been used to slidably mount various article support or securing members on the vehicle. However, the slats employed in certain existing article carrying systems have suffered from relatively complicated and inaccessible structures. For instance, when an article support or securing member slider has malfunctioned or the slat has had to be cleaned of debris, it has been relatively difficult to access the internal portions of the slat. Additionally, in some cases, the geometries of these slats have forced the load from the articles being carried to be supported entirely by cantilever-type channel structures. These structures are inherently weaker and more subject to distortion or damage under stress.

Furthermore, many prior article carrying systems have embodied the use of frictional forces to limit the movement of the article support or securing members along the slats. These frictional forces are created by a clamping device which applies pressure directly to the slat itself. This type of device is subject to loosening due to vibration or improper initial adjustment which reduces the frictional forces available to inhibit movement of the article support or securing members along the slats.

Accordingly, there has been a need for a low profile article carrying system in which the components of the system are more easily accessible to facilitate cleaning and repair, in which the loads placed on the system are supported in a way which reduces the potential for damage or distortion of the system, and in which the adjustable support or securing members may be more securely locked in position. The present invention fulfills these and other needs.

SUMMARY OF INVENTION

Briefly, and in general terms, the present invention provides an article carrying system utilizing rails directly mounted to the surface of a vehicle that permit the load being carried to be directly supported on a solid portion of the rails which is in intimate contact with the vehicle surface. Moreover, the rails of the article carrying system embody a relatively simple and accessible sidewardly facing channel structure for sliding adjustment of article support or securing members which enhances the ease of use and maintenance of the system. Additionally, the system has a slider for sliding adjustment of the article support or securing members which includes a novel gripping mechanism that can be manipulated with a single, continuous movement to lock or unlock the slider, yet is virtually immune to becoming inadvertently unlocked once placed in the locked position.

More specifically, in a presently preferred embodiment of the invention, the article carrying system has a pair of rails each of which has an upstanding wall with a track formed therein, the track presenting a sidewardly facing opening which runs continuously the length of the rail. Spaced from and parallel to the outer wall is a continuous ridge. The slider has a pedestal which rests on the bottom surface of the rail and is captured in the track between the outer wall and the ridge.

The rails each have a series of discrete upstanding protrusions which are formed in spaced-apart relationship along a line parallel to and disposed inwardly from the ridge. The gripping mechanism on the slider is in the form of a grip bar that is swingably mounted on the inside of the slider above the protrusions on the rail. The grip bar has a series of downwardly-projecting locking tabs that are spaced apart so as to snugly interlock the upstanding protrusions on the rails when the gripping bar is swung into a locking position. The side walls of the fingers are angled relative to the upstanding protrusions whereby longitudinal forces on the article carrying system, such as occur when the vehicle accelerates or decelerates, tend to cause the locking action between the grip bar and the rail to tighten for added safety. When the grip bar is swung to the sliding position by the user, however, its locking tabs straddle the upstanding protrusions to allow the slider to be moved along the rail.

It should be noted that the slider is captured in the rail in such a way that it cannot be removed therefrom except at the ends of the rail. Locking end caps are used to prevent the removal of the slider from the rail without a special tool. This locking feature greatly enhances the theft resistance of the article carrying system.

The foregoing and other advantages will become apparent from the following detailed description of the preferred embodiment.

BRIEF DESCRIPTION OF THE DRAWINGS

FIG. 1 is a fragmentary perspective view of the preferred embodiment of the article carrying system of the present invention as mounted on the roof of an automobile.

FIG. 2 is a partial cross-sectional view of the slide taken along the line 2—2 in FIG. 1, illustrating the grip bar in a locking position on the rail;

FIG. 3 is a side view taken along the line 3—3 in FIG. 2;

FIG. 4 is a partial cross-sectional view similar to FIG. 2, except that the grip bar is shown in a sliding position;

FIG. 5 is a plan view, partially in cross-section, taken along the line 5—5 in FIG. 2 and showing the grip bar in a locking position;

FIG. 6 is a plan view, partially in cross-section, similar to FIG. 5, except that the grip bar is shown in an intermediate position between a locking position and a slide position;

FIG. 7 is a fragmentary plan view of the rail showing the end cap;

FIG. 8 is a cross-sectional view of the rail taken along the line 8—8 in FIG. 7;

DESCRIPTION OF THE PREFERRED EMBODIMENTS

Figure 9:
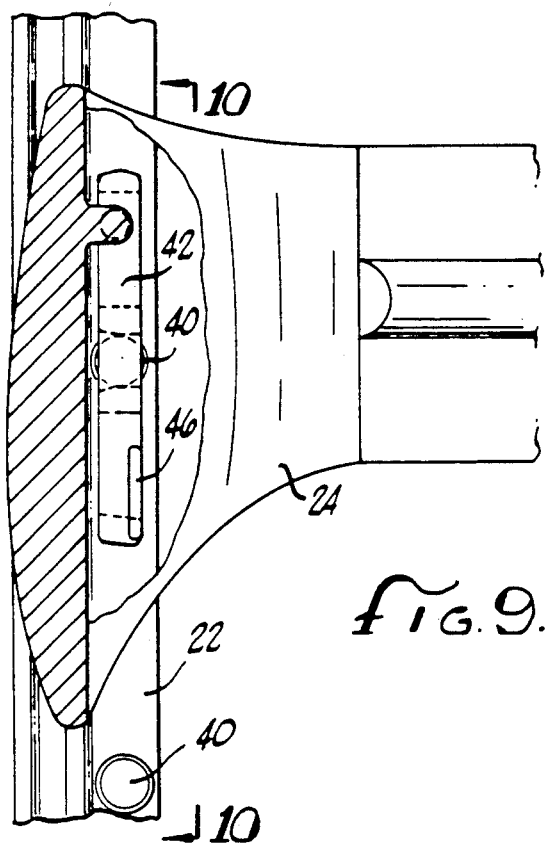
FIG. 9 is a plan view, partially in cross-section, similar to FIG. 5, except that the grip bar is shown in an alternative locking position on the rail.

Referring now to the drawings, and particularly FIG. 1 thereof, there is shown an article carrying system in accordance with the present invention comprising an article carrier or rack, generally designated by the reference numeral 20, mounted on the roof of an automobile. The article carrier 20 includes a pair of rails 22 disposed longitudinally on the automobile roof in spaced-apart relationship, with a pair of sliders 24 carried by each rail. FIG. 1 shows, by way of example, the use of sliders that are adapted to mount a pair of cross-bars 26 which laterally span the rails 22, however, the present invention contemplates the use of any number of article support or securing members, including tie-downs, in addition to or in lieu of cross-bars. It will be appreciated that various known accessories (not shown) may be mounted on the cross-bars 26 to facilitate the transport of skis, bicycles and other special items. Moreover, the article carrying system is suitable for mounting on other surfaces, such as trunk lids of automobiles and roofs of vans and campers. A plurality of spaced-apart reinforcement bars 28 are fixed longitudinally to the automobile roof within the center area of the article carrier 20, as is conventional.

As best shown in FIGS. 2 and 8, each rail 22 has an elongated and generally flat, rectangular structure with an upstanding outer wall 30 formed along essentially the entire length of the rail. Each outer wall 30 has an inwardly directed overhanging portion 32 which serves to define a continuous, sidewardly facing track 34. Each rail also has a continuous upstanding ridge 36 formed on its upper surface that extends parallel to the track 34. The ridge 36 is disposed on the rail at a location somewhat inwardly from the innermost extent of the overhanging portion 32 of the outer wall 30 of the rail.

Each slider 24, as seen in FIG. 2, has a pedestal 38 formed on its end which fits within the track 34 between the outer wall 30 and the ridge 36. The cross-sectional shape of the pedestal 38 generally complements the cross-sectional shape of the track 34 and the ridge 36 such that the slider 24 is captured against any significant lateral movement, while the slider is permitted to be moved longitudinally relatively freely along the rail 22 when desired.

For aerodynamic and aesthetic reasons, the portion of the slider 24 above the pedestal 38 extends out and over the outer wall 30 in order to give the appearance of a virtually continuous, smooth and uninterrupted surface. Importantly, however, the bottom surface of the pedestal 38 rests on the upper surface of the rail 22 within the track 34. As a result, the load bearing forces from the cross-bars 26 (or other article support or securing members) are intended to be directly supported by the automobile roof through a portion of the rail 22 which is solid and in intimate contact with the roof for structural integrity. The portion of the slider 24 which extends over the outer wall 30 is designed to be spaced therefrom so that no load-bearing forces are placed on this cantilevered portion of the rail.

In order to allow the sliders 24 to be locked in place in a desired position on the rails 22, a series of distinct upstanding protrusions or lands 40 are formed along the upper surface of each rail. These protrusions 40 are formed at regular intervals along a line which is parallel to and disposed inwardly of the ridge 36. Each slider 24 also has a grip bar 42 which is swingably mounted near one of its ends to the bottom of a truncated mounting web 44 formed on the inner side of the slider. An upstanding handle 46 is formed at the distal end of the grip bar 42, opposite the pivot point. The grip bar 42 is mounted so that it is disposed above the protrusions 40 on the rail 22 and can swing around an axis which is generally perpendicular to the rail. As will be explained, there is sufficient clearance formed on the inner side of the slider 24 beneath the mounting web 44 that the grip bar 42 can be swung between a locking position where it overlies the protrusions 40 on the rail 22 and a sliding position where the grip bar is cross-wise to the protrusions.

More specifically, the grip bar 42 has a series of downwardly-projecting locking fingers or tabs 48 along its length. As best seen in FIGS. 3 and 5, the locking tabs 48 on the grip bar 42 are sized and spaced from each other such that when the grip bar is pivoted to the locking position, the locking tabs are capable of being wedged in intimate engagement with the protrusions 40 on the rail 22. In this state, the wedging action between the locking tabs 48 and the protrusions 40 prevent any longitudinal movement of the slider 24 along the rail 22. As the grip bar 42 is manually swung out of the locking position (FIG. 6) and into the fully cross-wise sliding position (FIG. 4), the locking tabs 48 disengage the protrusions 40 to the point where a portion of the grip bar which is intermediate the locking tabs straddles the protrusions. In this state, there is ample clearance between the grip bar 42 and the protrusions 40 to permit the slider 24 to be moved longitudinally along the rail 22.

Figure 10:
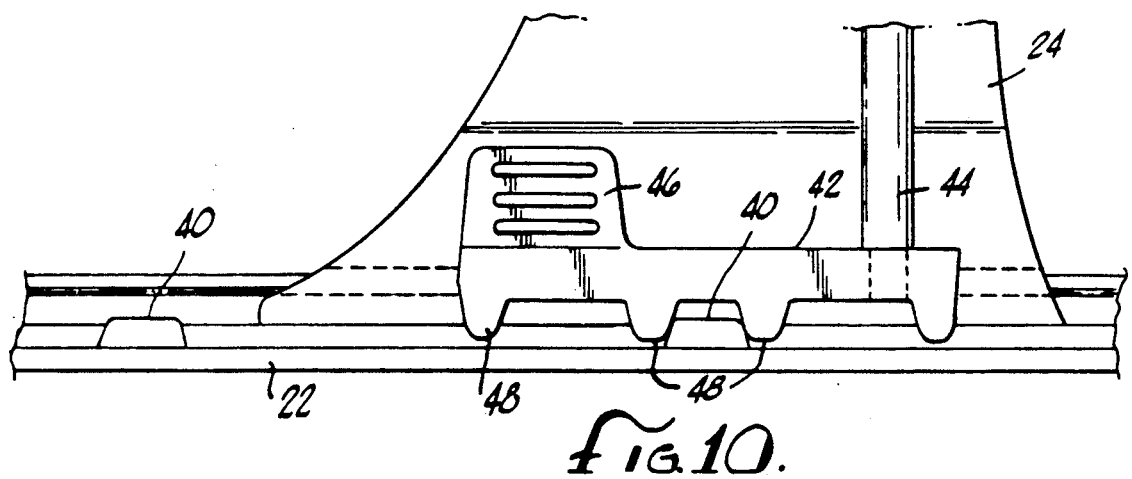
FIG. 10 is a side view taken along the line 10—10 in FIG. 9.

In the preferred embodiment, the grip bar 42 is designed such that at least two locking tabs 48 will engage at least one protrusion 40 when the grip bar is in the locking position. FIGS. 3, 5, 9 and 10 show such engagement. In FIGS. 3 and 5, the two endmost locking tabs 48 are engaging two protrusions 40 to prevent any longitudinal movement of the slider 24 along the rail. FIGS. 9 and 10 show two inner locking tabs 48 of the grip bar 42 engaging one protrusion 40, similarly preventing the slider 24 from any longitudinal movement along the rail 22. With an appropriate selection of the spacing and number of locking tabs 48 and protrusions 40, it will be appreciated that the slider 24, while not continuously adjustable along the rail, can be positioned at sufficiently close intervals to satisfy any reasonably required adjustment in ordinary use.

The protrusions 40 are formed as circular punches from the backside of the rail, although other shapes are possible. The locking tabs 48 are generally rectangular, but preferably are shaped such that it is more easy to align the tabs with the protrusions 40 before fully swinging the grip bar 42 into a locking position. This alignment feature can be accommodated by forming the locking tabs 48 with a taper with the narrow side of the taper furthest from the outer wall 30 of the rail 22. This configuration of the locking tabs 48 also has the significant advantage that it will serve to further secure the grip bar in the locking position when longitudinal forces are applied to the slider 24, as will happen when the automobile accelerates and decelerates.

It should be noted that another feature of the present invention is that the configuration of the rail 22 and the slider 24 do not permit the slider to be removed from the rail except at the ends thereof. The rail 22 has an end cap 50 with a security bolt 52 fastening the end cap to the rail (FIG. 7). The end cap 50 will help prevent unauthorized removal of the slider 24 from the rail 22 by requiring use of a special tool to remove the security bolt 52. The end cap 50 preferably is configured such that it conforms with the shape of the rail 22.

The rail 22 can be formed as an aluminum extrusion which is anodized for protection and to allow a low friction, sliding contact with pedestal 38. The slider 24 and grip bar 42 may be cast in glass-filled nylon. The rails 22 may be mounted to the surface of the vehicle either by epoxy or through bolts (not shown) extending through the rails to the vehicle.

Although a particular form of the invention has been illustrated and described, it will be apparent that various modifications can be made without departing from the spirit and scope of the invention. Accordingly, the invention is to be defined only by the appended claims.

What is claimed is:

1. An article carrying system comprising:
   at least one elongated rail adapted to be secured to the surface of a vehicle, said rail having a generally flat upper surface and an upstanding wall with a track formed therein defining a sidewardly facing opening, a ridge formed in said upper surface parallel to and spaced from said upstanding wall, and a plurality of spaced-apart protrusions on said upper surface parallel to and spaced from said ridge;
   at least one slider having a pedestal portion adapted to be received in said track formed in said rail and to rest on said upper surface, said slider being captured laterally between said upstanding wall and said ridge; and
   a grip bar swingably mounted on said slider and having a plurality of spaced-apart locking tabs depending therefrom, said grip bar capable of being swung such that it overlies said rail whereby said locking tabs lockingly engage at least one of said protrusions on said rail to lock said slider against longitudinal movement, and said grip bar capable of being swung such that it is cross-wise to said rail whereby said locking tabs clear said protrusions to permit longitudinal movement of said slider.

2. The article carrying system of claim 1, further comprising:
   a cross-bar adapted to be mounted on said slider in a generally perpendicular relationship to said elongated rail.

3. The article carrying system of claim 1, wherein said upstanding wall further comprises an outer wall and an overhanging portion, wherein said outer wall and said overhanging portion cooperate to define said track.

4. The article carrying system of claim 1, wherein said slider further comprises a mounting web adapted to pivotally retain said grip bar and said grip bar has a distal end having a handle adapted to be manually operated and at least two tabs sized and spaced such that a protrusion will be wedged between said tabs when the grip bar is swung such that it overlies said rail.

5. The article carrying system of claim 1, wherein said tabs are tapered to have a narrow end and a wide end, wherein said narrow end is furthest from said upstanding wall when said grip bar overlies said rail.

6. The article carrying system of claim 1, wherein at least a single grip bar tab may lockingly engage two of said plurality of protrusions when the grip bar is swung such that it overlies said rail.

7. The article carrying system of claim 1, wherein at least a single one of said protrusions may lockingly engage two of said grip bar tabs when said grip bar is swung such that it overlies said rail.

8. The article carrying system of claim 1, wherein at least two of said grip bar tabs may lockingly engage at least two of said plurality of protrusions when the grip bar is swung such that it overlies said rail.

9. The article carrying system of claim 1, further comprising:
   an end cap secured to said rail such that said slider may not be removed from said rail without first removing said end cap from said rail.

10. The article carrying system of claim 1, wherein said slider is shaped to extend over said upstanding wall to create an aerodynamic shape at the interface between said slider and said rail.

11. An article carrying system comprising:
    at least one elongated rail adapted to be secured to the surface of a vehicle, said rail having a upper surface and an upstanding wall with a track formed therein defining a sidewardly facing opening, and a plurality of spaced-apart protrusions on said upper surface parallel to and spaced from said track;
    at least one slider having a pedestal portion adapted to be received in said track formed in said rail and to rest on said upper surface;
    means for capturing said slider between said upstanding wall and said protrusions; and
    a grip bar swingably mounted on said slider, said grip bar having a plurality of spaced-apart locking tabs depending therefrom, said grip bar capable of being swung into a locking position such that it lockingly engages at least one of said protrusions on said rail to lock said slider against longitudinal movement, and said grip bar capable of being swung into an adjusting position whereby said locking tabs clear said protrusions to permit longitudinal movement of said slider.

12. The article carrying system of claim 11, wherein said means for capturing said slider between said upstanding wall and said protrusions is a ridge associated with said rail.

13. The article carrying system of claim 11, further comprising:
    a cross-bar adapted to be mounted on said slider in a generally perpendicular relationship to said elongated rail.

14. The article carrying system of claim 11, wherein said upstanding wall further comprises an outer wall and an overhanging portion; said outer wall and said overhanging portion cooperating to define said sidewardly facing track.

15. The article carrying system of claim 11, wherein said slider further comprises a mounting web adapted to pivotally retain said grip bar and said grip bar has a distal end defining a handle, said handle adapted to be manually operated, said grip bar further having at least two tabs sized and spaced such that a protrusion will be wedged between said tabs when said grip bar is swung such that it overlies said rail.

16. The article carrying system of claim 11, wherein:
    said tabs are tapered wherein the narrow end is furthest from said upstanding wall when said grip bar overlies said rail.

17. The article carrying system of claim 11, wherein at least a single grip bar tab may lockingly engage two of said plurality of protrusions when the grip bar is swung such that it overlies said rail.

18. The article carrying system of claim 11, wherein at least a single one of said protrusions may lockingly engage two of said grip bar tabs when the grip bar is swung such that it overlies said rail.

19. The article carrying system of claim 11, wherein at least two of said grip bar tabs may lockingly engage at least two of said plurality of protrusions when the grip bar is swung such that it overlies said rail.

20. The article carrying system of claim 11, further comprising:
an end cap secured to said rail such that said slider may not be removed from said rail without first removing said end cap from said rail.

21. The article carrying system of claim 11, wherein said slider is shaped to extend over said upstanding wall to create an aerodynamic shape at the interface between said slider and said rail.

22. The article carrying system comprising:
at least two elongated rails adapted to be secured to the surface of a vehicle in a spaced parallel relationship, each of said rails comprising an upper surface, an outer wall and an overhanging portion cooperating to define a sidewardly facing opening, a ridge formed in said upper surface parallel to and spaced from said outer wall, and a plurality of spaced-apart protrusions on said upper surface parallel to and spaced from said ridge.

said rails secured to the vehicle surface such that said sidewardly facing opening on each of said rails faces the opposite rail;

at least one slider associated with each of said rails, each of said sliders having a pedestal portion adapted to be received in said track formed in said rail and to rest on said upper surface, said slider being captured between said upstanding wall and said ridge;

a grip bar swingably mounted on each of said sliders, said grip bar having a plurality of spaced-apart locking tabs depending therefrom, said grip bar capable of being swung into a locking position such that said locking tabs lockingly engage at least one of said protrusions on said rail to lock said slider against longitudinal movement, and said grip bar capable of being swung into an adjusting position whereby said locking tabs clear said protrusions to permit longitudinal movement of said sliders; and a cross-bar mounted to both of said sliders such that said cross-bar laterally spans said spaced rails.

* * * * *